United States Patent
Bhattacharya et al.

(10) Patent No.: US 11,763,056 B2
(45) Date of Patent: Sep. 19, 2023

(54) METHOD AND SYSTEM FOR CUSTOM MODEL DEFINITION OF ANALOG DEFECTS IN AN INTEGRATED CIRCUIT

(71) Applicant: Synopsys, Inc., Mountain View, CA (US)

(72) Inventors: Mayukh Bhattacharya, Mountain View, CA (US); Michael Durr, Mountain View, CA (US); Mira Tzakova, Mountain View, CA (US); Beatrice Solignac, Mountain View, CA (US); Rayson Yam, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 66 days.

(21) Appl. No.: 17/235,605

(22) Filed: Apr. 20, 2021

(65) Prior Publication Data

US 2021/0326506 A1  Oct. 21, 2021

Related U.S. Application Data

(60) Provisional application No. 63/012,757, filed on Apr. 20, 2020.

(51) Int. Cl.
*G06F 30/367* (2020.01)
*G06F 119/02* (2020.01)

(52) U.S. Cl.
CPC ........ *G06F 30/367* (2020.01); *G06F 2119/02* (2020.01)

(58) Field of Classification Search
CPC . G06F 30/367; G06F 2119/02; G06F 2111/16
See application file for complete search history.

(56) References Cited

U.S. PATENT DOCUMENTS

| | | | |
|---|---|---|---|
| 8,863,050 B1 * | 10/2014 | O'Riordan | G06F 30/367 716/136 |
| 9,372,946 B2 * | 6/2016 | Sunter | G06F 30/33 |
| 10,346,273 B2 * | 7/2019 | Fricano | G01R 31/2846 |
| 10,353,789 B1 * | 7/2019 | Najibi | G06F 30/30 |
| 10,592,625 B1 * | 3/2020 | Tang | G01R 31/2894 |
| 10,657,207 B1 * | 5/2020 | Tang | G06F 30/333 |
| 10,997,332 B1 * | 5/2021 | Kukai | G06F 30/392 |
| 11,501,050 B1 * | 11/2022 | Korchemny | G06F 30/367 |
| 2004/0078175 A1 * | 4/2004 | Shaw | G06F 11/261 714/E11.167 |
| 2010/0229061 A1 * | 9/2010 | Hapke | G01R 31/318342 714/740 |
| 2011/0202804 A1 * | 8/2011 | Sunter | G01R 31/318577 714/E11.155 |

(Continued)

*Primary Examiner* — Nha T Nguyen (74) *Attorney, Agent, or Firm* — Weaver Austin Villeneuve & Sampson LLP (57) ABSTRACT

A method of simulating defects in an analog circuit design includes, in part, defining a multitude of defect models, defining a defect scope associated with the defect models, and compiling, by a processor, the defect models, the defect scope, and a netlist associated with the analog circuit design. The method further includes, in part, scanning the netlist to identify a multitude of nodes to which a multitude of defects defined by the defect models and the defect scope are applied, injecting the multitude of defects at the identified nodes, and simulating the analog circuit design using the injected defects.

13 Claims, 8 Drawing Sheets (56) References Cited

U.S. PATENT DOCUMENTS

| | | | |
|---|---|---|---|
| 2018/0060472 A1* | 3/2018 | Chen | G01R 31/318342 |
| 2018/0364298 A1* | 12/2018 | Grosse | G01R 31/31912 |
| 2019/0050515 A1* | 2/2019 | Su | G01R 31/007 |
| 2019/0095298 A1* | 3/2019 | Fricano | G01R 31/2846 |
| 2019/0187207 A1* | 6/2019 | Pillay | G06F 30/33 |
| 2020/0057106 A1* | 2/2020 | Balasubramanian | H03M 1/1076 |
| 2021/0373077 A1* | 12/2021 | Liu | G01R 31/318371 |

* cited by examiner

METHOD AND SYSTEM FOR CUSTOM MODEL DEFINITION OF ANALOG DEFECTS IN AN INTEGRATED CIRCUIT

RELATED APPLICATION

The present application claims benefit under 35 USC 119(e) of U.S. Patent Application No. 63/012,757, filed Apr. 20, 2020, the content of which is incorporated herein by reference in its entirety.

TECHNICAL FIELD

The present disclosure relates to defect analysis in integrated circuits, and more particularly to defect detection and analysis in integrated circuits that include analog circuitry.

BACKGROUND

Digital fault simulation, testing, and design-for-testability have matured to such a level that the probability of failure in digital blocks of an integrated circuit (IC) is substantially lower than it is in the analog blocks of the IC. In a mixed signal IC which includes both analog and digital circuitry, as much as 80% of field returns have been attributed to defects in analog circuits. Proper assessment of the test coverage for analog circuits necessitates accurate and relatively fast analog fault simulation capability.

SUMMARY

A method of simulating defects in an analog circuit design, in accordance with one embodiment of the present disclosure, includes, in part, defining a multitude of defect models, defining a defect scope associated with the defect models, and compiling, by a processor, the defect models, the defect scope, and a netlist associated with the analog circuit design. The method further includes, in part, scanning the netlist to identify a multitude of nodes to which a multitude of defects defined by the defect models and the defect scope are applied, injecting the multitude of defects at the identified nodes, and simulating the analog circuit design using the injected defects.

A non-transitory computer readable medium, in accordance one embodiment of the present disclosure includes stored instructions, which when executed by a processor, cause the processor to receive definition of a multitude of defect models, receive definition of a defect scope associated with the defect models, and compile the defect models, the defect scope, and a netlist associated with an analog circuit design. The instructions further cause the processor to scan the netlist to identify a multitude of nodes to which a multitude of defects defined by the defect models and the defect scope are applied. The instructions further cause the processor to inject the defects at the identified nodes, and simulate the analog circuit design using the injected defects.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to a method and system for custom model definition and testing of analog defects in an integrated circuit. As is known, the manufacturing test coverage is related to the number of defective integrated circuits (ICs) as defined below:

$$DL=1-Y^{(1-TC)}$$

In the above equation, DL represents the defect level, Y represents the yield, and TC represents test coverage. Properly assessing test coverage for an analog circuit necessitates accurate and relatively fast analog fault simulation capability.

Analog systems, such as Advanced driver-assist systems (ADAS), are gaining popularity in automotive and are expected to continue to grow as the automotive industry moves towards hands-off eyes-off autonomous vehicles. Many of the integrated circuits at the heart of the ADAS systems include significant analog circuitry. Fault simulation of mission-critical circuit blocks is often suggested as a methodology to compute the quality metrics, e.g., single point fault metric (SPFM), latent fault metric (LFM), and probabilistic metric for hardware failure (PMHF), as recommended by the functional safety standards, such as ISO 26262. Thus, both from manufacturing test coverage and from functional safety standpoints, fast and accurate analog fault/defect simulation is of central importance.

To perform defect simulation for a circuit, the defects are first enumerated. In analog circuits, defects are characterized by either unwanted shorts between circuit nodes and/or an unwanted open at a circuit node. Often, the generic defect models that operate on the assumption that devices such as metal-oxide-semiconductor field-effect transistors (MOSFETs), bipolar junction transistors (BJTs), diodes, and the like, are represented uniformly in various netlists, are ineffective.

In an analog circuit simulator, such as SPICE, a MOSFET may be represented by a format/model that defines the MOSFET's name, the names of its drain node, gate node, source node, bulk node, the MOSFET's model name, and its parameter-list, such as the area of its source. A MOSFET model may be represented by a subcircuit macro model in which each occurrence of the MOSFET is represented as an instantiation of the MOSFET model, and not of the basic native MOSFET model. Each subcircuit MOSFET macro model may contain one or more MOSFETs and various other circuit elements such as a resistor, a capacitor, an inductor, a current-controlled source, a voltage-controlled source, and the like. A typical native defect generator, also known as a defect compiler, fails to recognize, among other things, that the defects to be generated should be placed, for example, at the ports of an instance of the subcircuit macro model and not at each instance of the MOSFET used within each subcircuit macro model.

Figure 1:
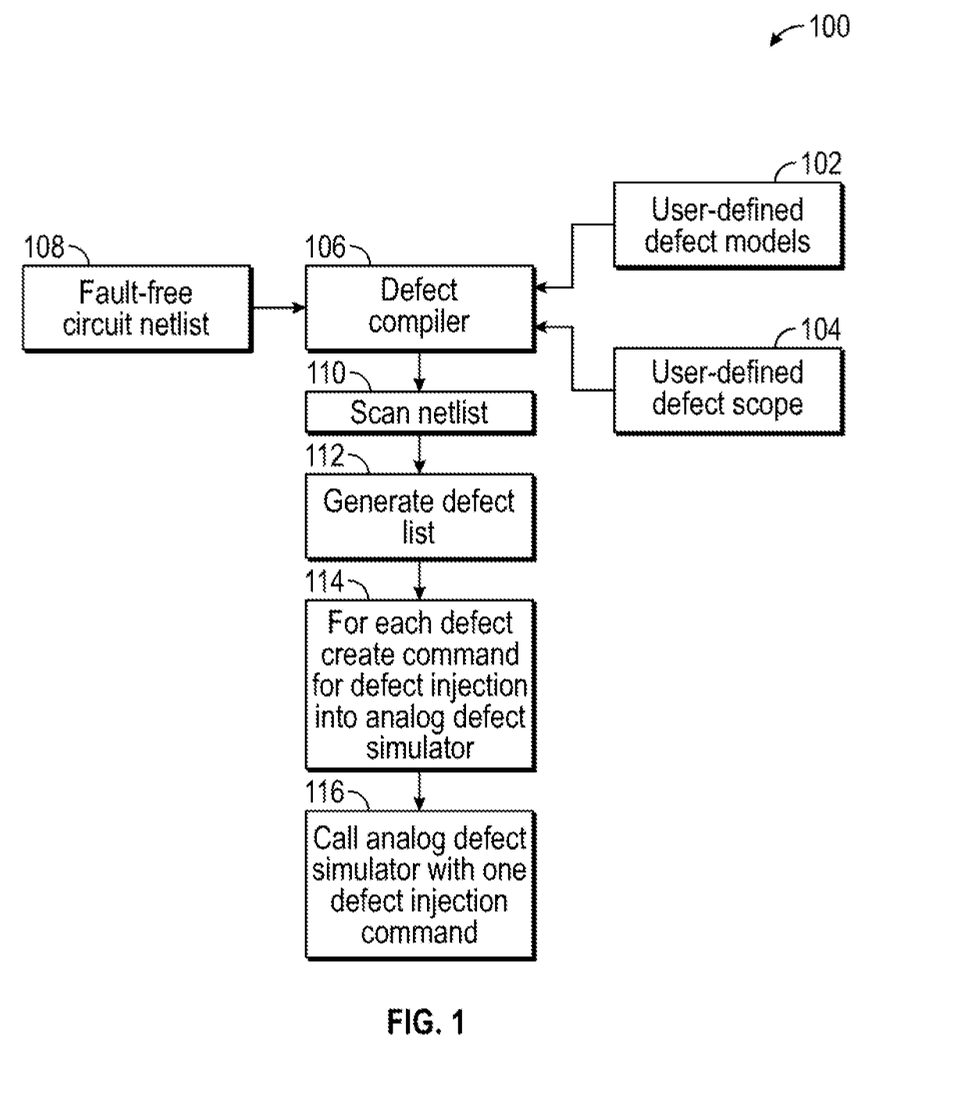
FIG. 1 is a flowchart of processes used during an analog defect simulation, in accordance with one embodiment of the present disclosure.

FIG. 1 is a flowchart 100 for performing defect analysis and simulation of an analog circuit, in accordance with one embodiment of the present disclosure. A user supplies information about one or more defect models 102, and defect scope 104 to a defect compiler 106. For a device, such as a MOSFET, the defect (also referred to herein as fault) model defines the device ports and the value(s) of a resistor or a network of resistors, capacitor or a network of capacitors, and/or inductor or a network of inductors associated with each port for both short and open faults. For example, for a MOSFET, the ports (also referred to herein as terminals or nodes) include, the source, drain, gate and the substrate (bulk) ports of the MOSFET. For a short fault, the user-defined defect model may specify a resistance of, for example, 200 ohms, and a capacitance of, for example, 0.1 picofarads. For an open fault, the user-defined defect model may specify a resistance of, for example, $10^9$ ohms, and a capacitance of, for example, 1 microfarad. It is understood that the above numerical values are examples only and that a user may specify any other values.

A user-defined defect model may include different values for a resistor—or a network of resistors such as a resistive-divider described below with reference to FIG. 4—for different terminals of a device when checking for short and open faults. For example, the user-defined defect model may specify a value of infinite resistance for an open fault at the gate terminal of a MOSFET, and a resistance of $10^8$ ohms for an open fault at the source or drain terminal of the MOSFET. In a similar manner, the user-defined model may specify a resistance of 100 ohms for a short fault at the gate terminal of a MOSFET, and a resistance of 50 ohms for a short fault at the source or drain terminal of the MOSFET.

In one embodiment, when a short defect model is defined as including a resistor, a capacitor, and an inductor, the resistor and the capacitor are placed in parallel with each other and in series with the inductor. In one embodiment, a short defect model may be defined to include an array of sets of terminals where the short defect may be injected. For example, if a short defect model is defined for terminals A, B, and C, a user may specify only terminal sets (A, B) and (B, C), thus causing the short defect model to be applied between terminal pairs (A, B), and (B, C) but not between terminal pair (A, C). Defect injection refers to a process by which a fault-free circuit netlist is modified to include defect models representative of the defects. For example, the injection of a short defect between first and second nodes of a circuit results in the addition of a defect having a pair of terminals—representative of the short defect—across the first and second nodes of the circuit. In a similar manner, the injection of an open defect at a first node of a circuit results in disconnecting the first node from the circuit and inserting a defect—representative of the open defect—between the first node and a net to which the first node was connected prior to the disconnection.

The user-defined defect model may exclude certain fault conditions for both devices and subcircuits. For example, the user may specify in the defect model that short fault checks between, e.g., drain and bulk terminals of MOSFETs are not to be performed. In another example, the user may specify that open fault checks on, e.g., bulk terminals of MOSFETs are not to be performed.

In some embodiments, instead of open and short faults, a user may be interested in what is referred to as stuck-on and stuck-off faults. Such faults generally refer to a MOSFET being either in a permanent on or permanent off state. The defect models for such faulty behaviors are specific shorts and/or opens that embodiments of the present disclosure enable a user to define. For example, a stuck-on fault may be modeled by a drain-source short defect. A stuck-off fault may be modeled as an open drain, an open source fault model, or a short between the gate and bulk terminals of a MOSFET.

A defect model may include names that define the devices to which the defect model applies. For example, a defect model that checks for a short fault between the source and gate terminals of a MOSFET may be defined to apply to NMOS and PMOS transistors with model names, such as, nchlp and pchlp, but not to NMOS and PMOS transistors with model names, such as, nchfet or pchfet.

In a similar manner, for a subcircuit, the user-defined defect model may specify the subcircuit name, the input/output ports of the subcircuit and the values of resistance(s), capacitance(s) and/or inductance(s) associated with each such port for both short and open faults, as described further below.

The user-defined defect scope enables a user to specify, at compilation, the hierarchical level of a circuit netlist at which a defect model is to be applied. For example, a defect scope may specify that a defect model is to be applied at the lowest possible level of hierarchy to, for example, the transistors disposed in that level of hierarchy. Alternatively, the defect scope may specify that a defect model is to be applied only to select ports of the transistors at that level of hierarchy.

For example, assume that a user is interested in defect analysis of a phase locked-loop (PLL) that includes, in part, a phase detector, a filter, and a voltage-controlled oscillator (VCO). Assume that the VCO has one input terminal and one output terminal. In accordance with embodiments of the present disclosure, a user may define the defect scope so as to check for faults in every transistor disposed in the PLL. The user may also define the defect scope so as to check for faults in the transistors disposed in the VCO only.

Alternatively, assume that the user is only interested in checking for short and open faults at input terminal VIN, output terminal VOUT, and supply voltage terminal VCC_VCO of the VCO block. To achieve this, in accordance with embodiments of the present disclosure, the user may define a pair of defect models named, for example, VCO_short and VCO_open. Model name VCO_short, which includes resistance and capacitance values as described above with respect to MOSFET transistors, may be defined so as to check for short faults between terminals VIN/VOUT, VIN/VCC_VCO and VOUT/VCC_VCO. Model name VCO_open, which also includes resistance and capacitance values, may be defined so as to check for open faults at terminals VIN, VOUT and VCC_VCO of the VCO block. As described above, it is understood that different resistance and capacitance values may be specified when checking for short faults between different terminal pairs of the VCO, or when checking for open faults at different terminals of the VCO. In other words, embodiments of the present disclosure enable a user to check for short and open faults at any level of hierarchy and using any values for resistors or resistor networks, capacitors or capacitor networks, and inductors or inductor networks. at different ports of a device or subcircuit.

Referring to FIG. 1, the user-defined defect models and defect scope, together with a circuit netlist 108 that does not include any faults, are compiled by a defect compiler at 106. The defect models are subsequently injected into the fault-free circuit netlist to simulate the effect of such defects. As was described above, the defect models may include short between any two terminals of a device, an open at any terminal of a device, a short between any two terminals of a subcircuit instance of the device, open at any terminal of a subcircuit instance of the device, short between any two nodes of a net in a circuit or subcircuit, open at a node or net in a circuit or subcircuit, and the like.

At 110, the design netlist is scanned to identify all locations where the defects defined by the defect scope and models occur. Such locations may include the design at its highest hierarchical level as well as its subcircuits. Subcircuits or device instantiations that are excluded explicitly in the defect scope are not scanned. At 112, a list of the defects generated by the netlist scan is generated.

At 114, for each defect defined by the user-defined defect models and scope, a commend is created to inject the defect at the identified locations for the analog simulator. At 116, the circuit is simulated with the injected defects. A determination is subsequently made as to whether the response of the integrated circuit with the injected defects meets the functionality and performance requirements.

In some embodiments, default open and short defect models are provided for each device type, such as an MOS transistor, a bipolar junction transistor, a junction field effect transistor, a diode, a resistor, a capacitor, an inductor, and the like. A user may then select between the default defect models or the defect models that the user defines. Alternatively, the user may select to apply the default defect models to a first portion (or a first subset of the devices) of the circuit, and the user-defined defect models to a second portion (or a second subset of the devices) of the circuit, as specified by the defect scope defined by the user.

In some embodiments, the values defined for resistance(s), capacitance(s) and inductance(s) associated with a user-defined models for both short and open faults are compared to corresponding parasitic resistance(s), capacitance(s), and inductance(s) threshold values. A resistance value that is smaller than a resistor threshold value $R_t$ may be considered parasitic thereby causing the resistance value not to be injected for short or open faults. Similarly, a capacitance value that is smaller than a capacitance threshold value $C_t$ may be considered parasitic thereby causing the capacitance value not to be injected for short or open faults. In a similar manner, an inductance value that is smaller than an inductance threshold value $L_t$ may be considered parasitic thereby causing the inductance value not to be injected for short or open faults.

As described above, for each device type a user may define a name, the device ports, and the fault type including short and/or open. In some embodiments, global default resistance, capacitance, and inductance values associated with both short and open faults are overwritten by their associated resistance, capacitance, and inductance values defined by a user model. Accordingly, if a user does not define a resistance, capacitance or inductance value associated with either a short or an open fault, corresponding global default values for the resistance, capacitance and inductance are used. As was also described above, the user defined defect scope may include information about devices or subcircuit(s) to which the defect models are not to be applied. In some embodiments, the user defined defect scope may identify nets to which net short, and net open fault models are applied, as well as nets which are to be excluded from fault injection.

As described above with reference to FIG. 1, the netlist, the user-defined defect model, and the user-defined defect scope are used by a defect compiler at 106 to scan the netlist to find devices and ports to which the defect models apply. The compilation process may include a number of loops in order to apply the defect models. During such a process, the compiler identifies the nets to which the defect models are applied as well as the nets that are excluded from fault injection. To achieve this, for device terminal defects, the compiler scans/traverses the circuit netlist to identify the devices and device terminals that match the devices and device terminals defined in the defect models for each of the short and open defects. Subcircuits and/or devices that are excluded from the defect scope are not scanned by the compiler. For net defects (i.e., net-to-net short defect or a net-open defect) the compiler scans the list of all net-pairs and/or nets to identify matching nets. Nets excluded from the defect scope are not scanned by the compiler.

Similarly, the compiler scans the circuit netlist to identify matching devices, subcircuit, nodes/nets as defined in the defect models, to identify the devices and subcircuits that are to be included in the fault analysis as well as the devices and subcircuits that are excluded from the fault analysis. In some embodiments, defects which are electrically equivalent to one another may be grouped together. In one embodiment, the netlist topology is used to identify defect equivalency. For example, short defects which are between the same nets and use the same short defect model may be grouped together.

Figure 2:
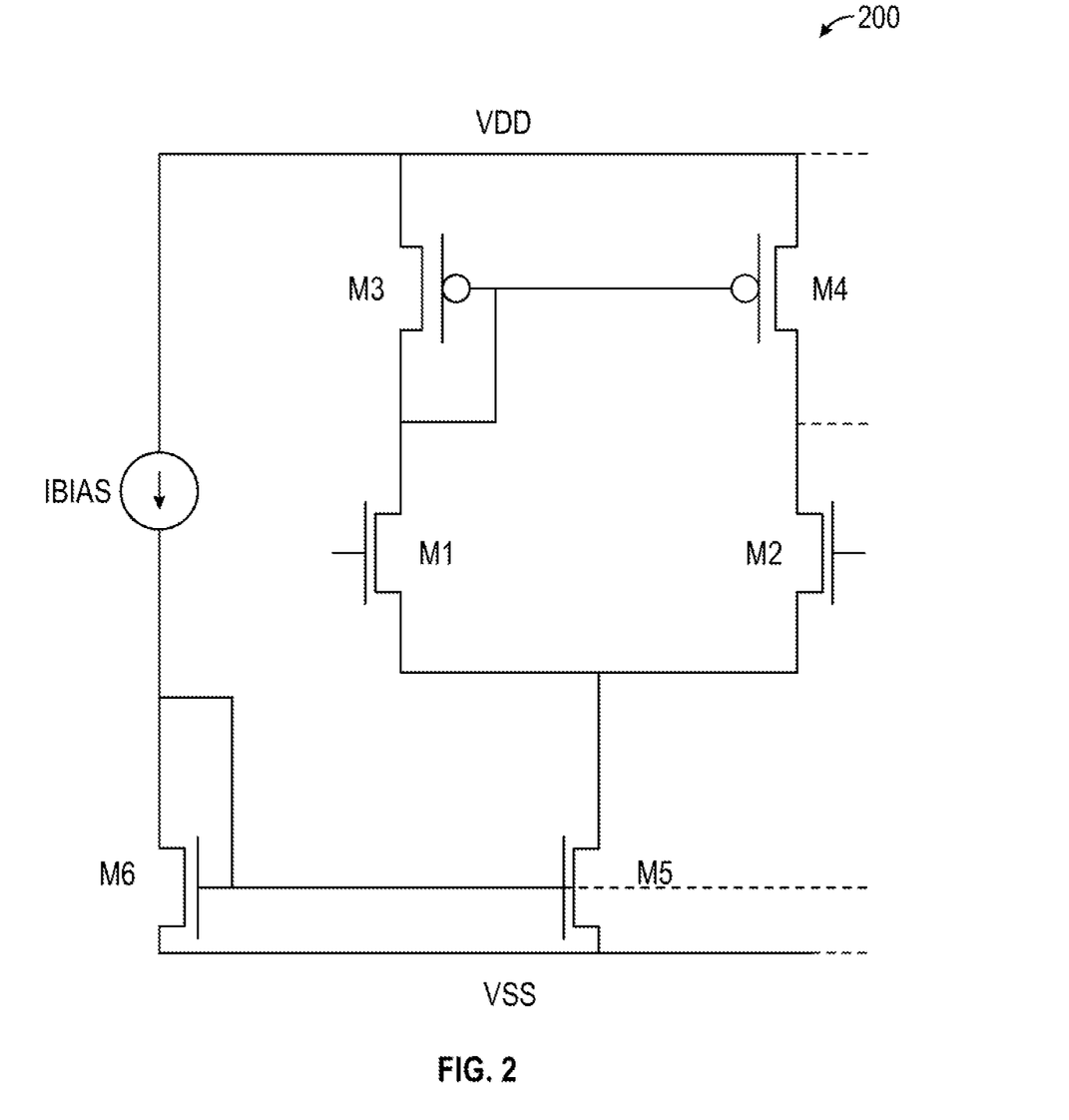
FIG. 2 is a schematic diagram of an amplifier.
Figure 3:
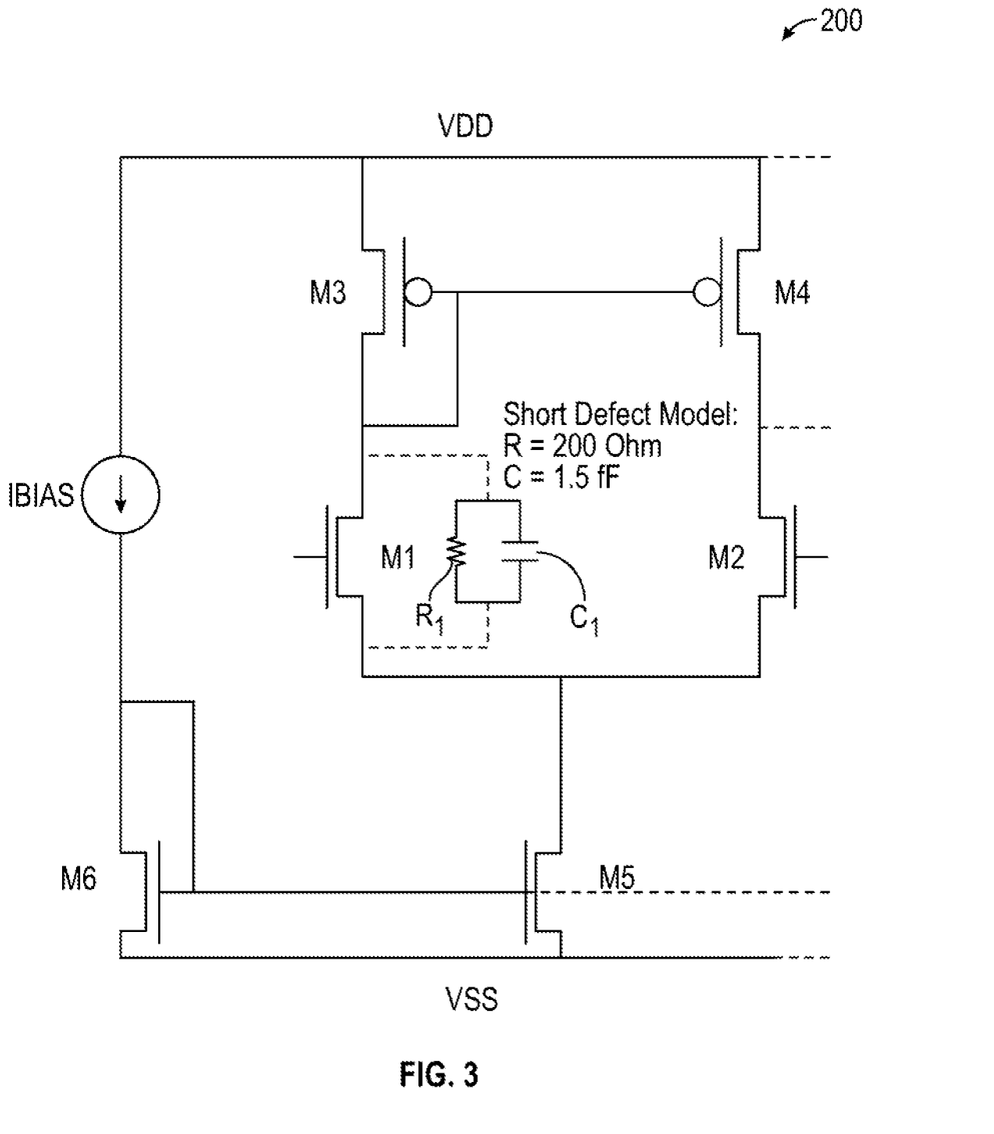
FIG. 3 is a schematic diagram of the amplifier of FIG. 2 modified to include a short defect model, in accordance with one embodiment of the present disclosure.

FIG. 2 is a transistor schematic diagram of an example of an amplifier 200 undergoing fault analysis in accordance with embodiments of the present disclosure. Amplifier 200 is shown as including current source IBIAS, PMOS transistors M3, M4, and NMOS transistors M1, M2, M5 and M6. Assume that the circuit designer/user is interested in determining the effect of a possible short between the drain and source terminals of transistor M1 on the functionality and performance of the amplifier. To achieve this, the designer defines a short defect model across the source and drain terminals of transistor M1. As shown in FIG. 3, the short model is defined to include a resistor R1 having a resistance of 200 Ohms and a capacitor C1 having a capacitance of 1.5 fF placed across the source and drain terminals of transistor M1. Amplifier 200 is then simulated using an analog simulator, such as SPICE, to determine the effect of the short defect represented by resistor R1 and capacitor C1 on the amplifier.

Figure 4:
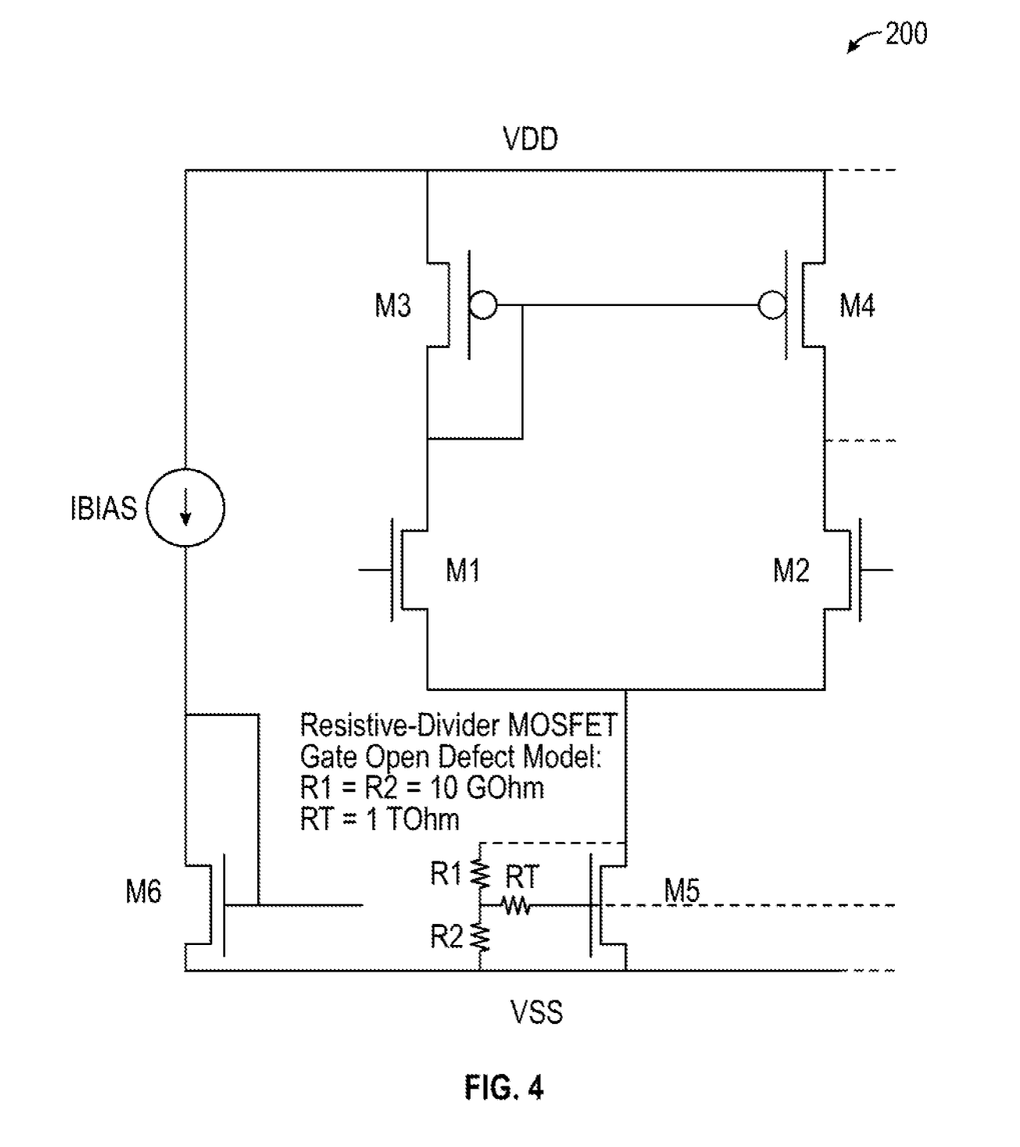
FIG. 4 is a schematic diagram of the amplifier of FIG. 2 modified to include an open defect model, in accordance with one embodiment of the present disclosure.

FIG. 4 shows amplifier 200 of FIG. 2 in which the gate terminal of transistor M5 is being checked for an open fault. The defect model defined by the user includes a resistive divider circuit shown as including resistors R1 and R2 each having a resistance of 10 Gohm, and resistor RT having a resistance of 1 Tohm. Amplifier 200 is then simulated using an analog simulator to determine the effect of the open defect represented by resistors R1, R2 and RT on the amplifier.

Figure 5:
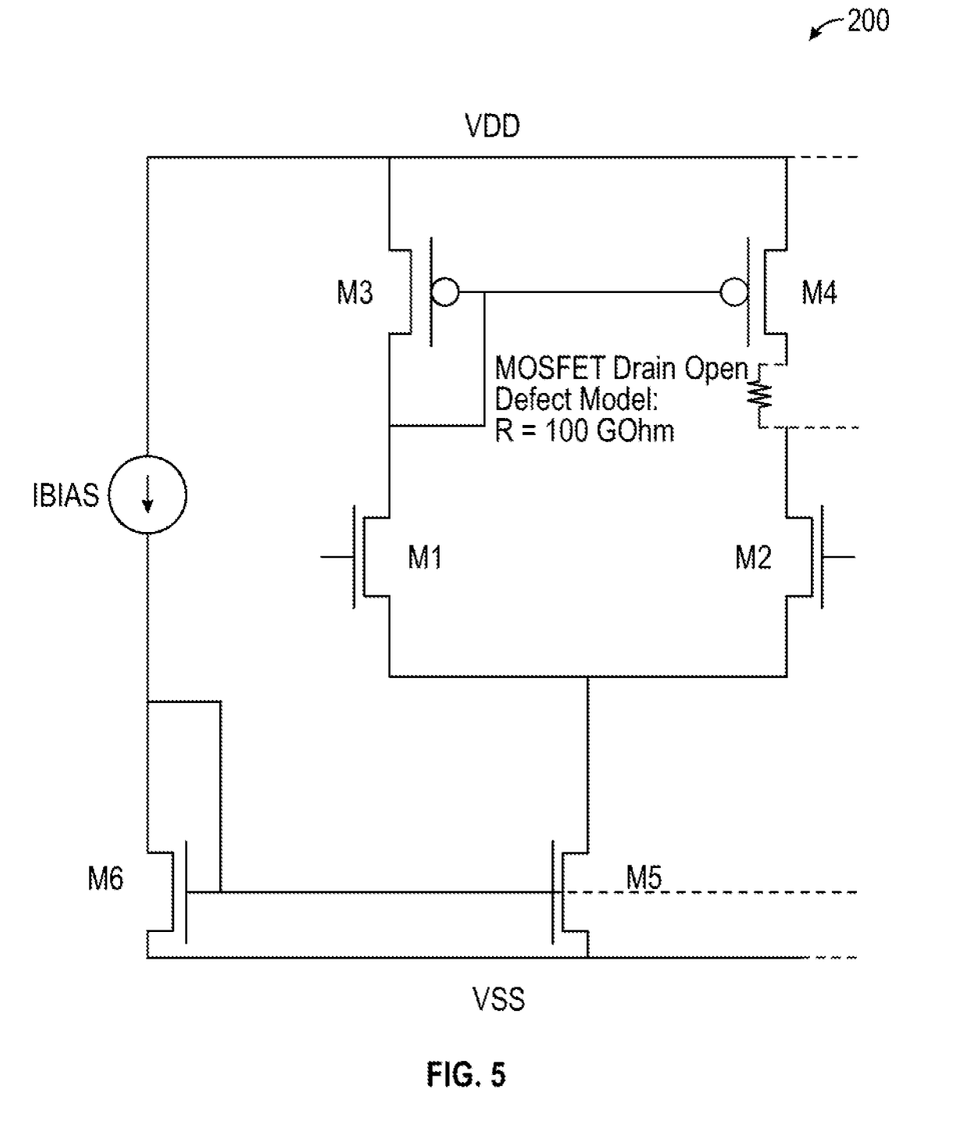
FIG. 5 is a schematic diagram of the amplifier of FIG. 2 modified to include an open defect model, in accordance with one embodiment of the present disclosure.

FIG. 5 show amplifier 200 of FIG. 2 in which the drain terminal of transistor M4 is being checked for an open fault. The defect model defined by the user includes a resistor R having a resistance of 100 Gohms. Amplifier 200 is then simulated using an analog simulator to determine the effect of the open defect represented by resistor R on the amplifier.

Figure 6:
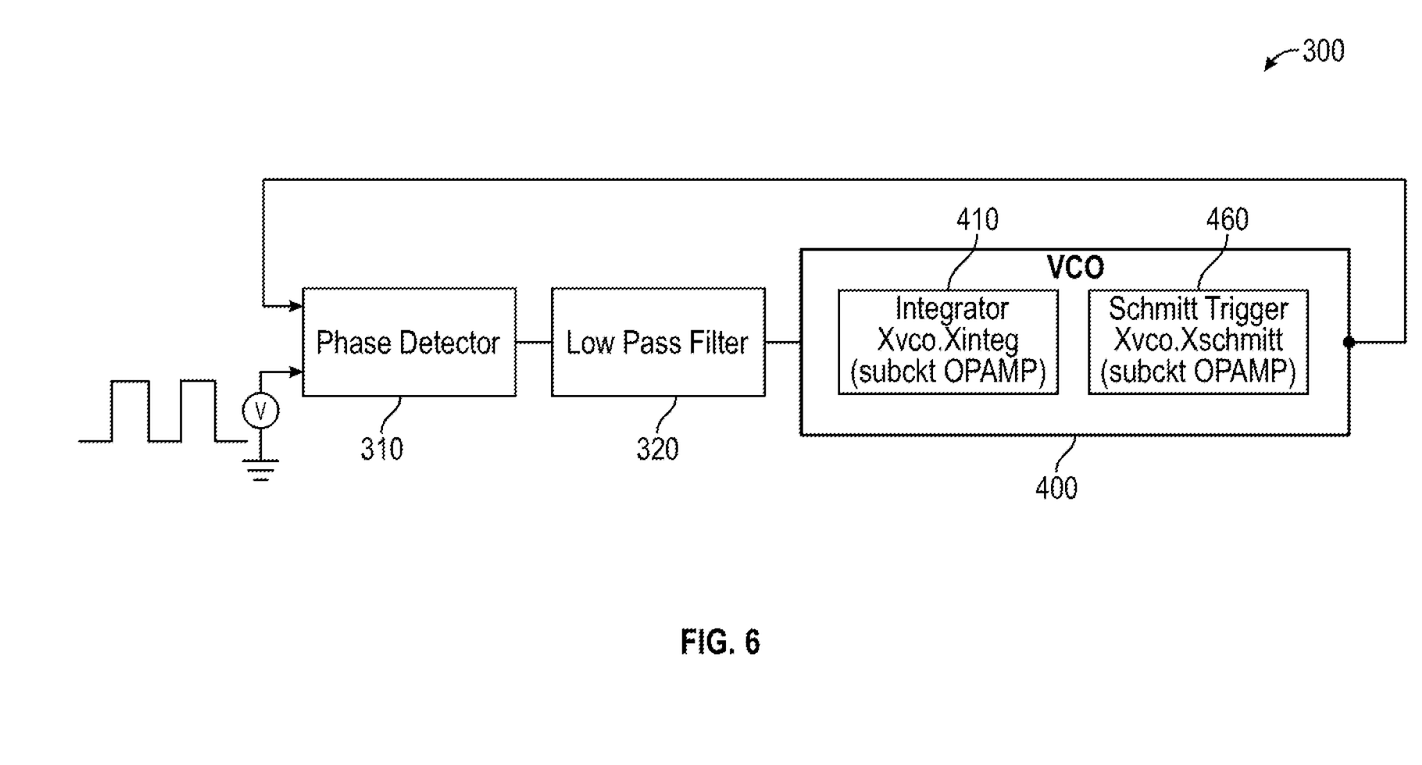
FIG. 6 is a simplified high-level block diagram of a phase locked-loop.

FIG. 6 is a block diagram of a phase locked-loop (PLL) 300 shown as including, in part, a phase detector 310, a low-pass filter 320, and a voltage-controlled oscillator (VCO) 400. VCO 400 is shown as including two instances (also referred to as instantiations) of the same operational amplifier (OPAMP), namely OPAMP 410 and OPAMP 460. OPAMP 410 is used as an integrator and has a subcircuit name Xvco.Xinteg. OPAMP 460 is used as a Schmitt trigger and has a subcircuit name Xvco.Xschmitt.

A designer/user may be interested in checking for short and open faults (defects) in all transistors and capacitors disposed in PLL 300, in accordance with the 6 user-defined models described below:

1. Short_mos_sd
   a. Rshort=100 Ohm
   b. Terminal: Source, Drain
2. Short_mos_gate
   a. Rshort=200 Ohm
   b. Terminal: (Gate, Source), (Gate, Drain)
3. Open_mos_sd
   a. Ropen=infinity
   b. Terminal: Source, Drain
4. Open_mos_gate_r
   a. Ropen=10 GOhm
   b. Terminal: Gate
5. Open_mos_gate_rdiv
   a. R1=R2=1 TOhm
   b. Terminal: Gate
6. Capacitor_open
   a. Ropen=infinity
   b. Copen=1e-18 F Model name short_mos_sd checks for short faults between the source and drain terminals of the MOS transistors disposed in the PLL by inserting a 100 Ohm resistor between these two terminals of the MOS transistors. Model name short_mos_gate checks for short faults between the gate/source terminals, and gate/drain terminals of the MOS transistors disposed in the PLL by inserting a 200 Ohm resistor between each of gate/source terminals, and gate/drain terminals of the MOS transistors. Model name open_mos_sd checks for open faults at each of the source and drain terminals of the MOS transistors disposed in the PLL by inserting a resistor having an infinite resistance at each of the source and drain terminals of the MOS transistors.

Model name open_mos_gate_r checks for open faults at the gate terminal of the MOS transistors disposed in the PLL by inserting a 10 Gohm resistor at the gate terminal of each MOS transistor. Model name open_mos_gate_rdiv checks for open faults at the gate terminal of the MOS transistors disposed in the PLL by inserting a resistive network that includes a first resistor having a resistance of 1 Tohm disposed between the gate and drain terminal of each MOS transistor, and a second resistor having a resistance of 1 Tohm disposed between the gate and source terminals of each MOS transistor. Since model open_mos_gate_rdiv does not define a value for a resistor that should be included between the gate and the common terminals of resistors R1 and R2, as shown in FIG. 4, a default value for this resistor (shown as resistor RT in FIG. 4) is used. Model name Capacitor_open checks for open faults at both terminals of each capacitor disposed in the PLL (e.g., the capacitor in the low-pass filter) by inserting a resistor having an infinite resistance at each terminal of the capacitors, and a capacitor having a capacitance of $10^{-18}$ farads in parallel with the resistor.

As described above, embodiments of the present disclosure enable a user to define the scope of each fault model. For example, with reference to the PLL shown in FIG. 6, the user may define the scope so as to exclude the phase detector from any fault analysis. The user may define the scope so that the model name Capacitor_open is applied only to the capacitor(s) disposed in the low pass filter and in subcircuit Xvco.Xinteg 410. The user may also define the scope so that the model names Short_mos_sd, Short_mos_gate, Open_mos_sd, and Open_mos_gate_r are applied only to the low-pass filter and the VCO blocks. The user may further define the scope so that the model name Open_mos_gate_r-div is applied only to the subcircuit Xvco.Xschemitt block 460.

Figure 7:
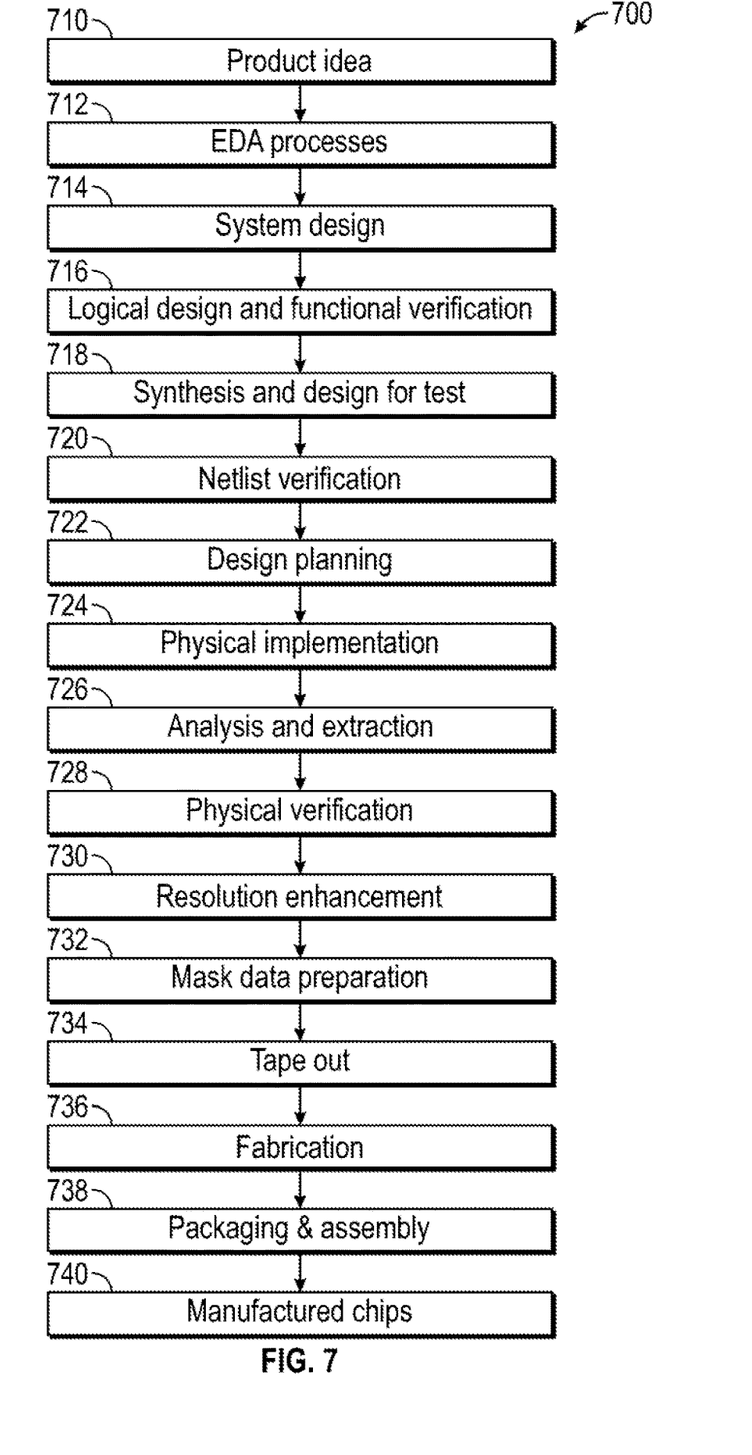
FIG. 7 is a flowchart of various processes used during the design and manufacture of an integrated circuit, in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower level representation of a design adds more useful detail into the design description, for example, more details for the modules that include the description. The lower levels representation of a design may be generated by a computer, derived from a design library, or created by another design automation process. An example of a specification language representative of a lower level description of a design is SPICE, which is used for detailed descriptions of circuits with many analog components. Descriptions at each level of representation are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 8, or host system 807 of FIG. 5) may be used to store the programs and data structures that are used by some or all of the EDA products described herein, and products used for development of cells for the library and for physical and logical design that use the library.

Figure 8:
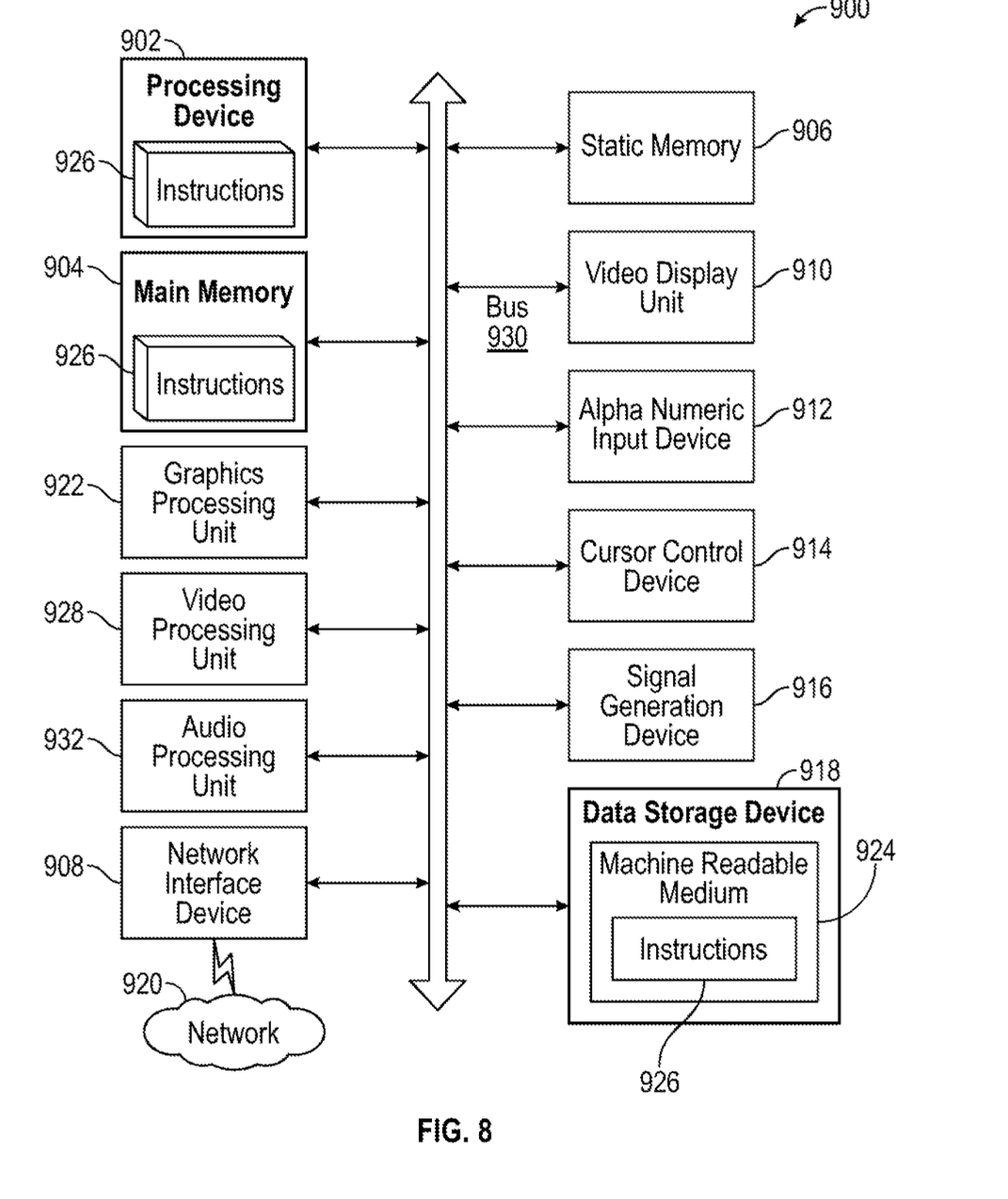
FIG. 8 is an example of a computer system in which embodiments of the present disclosure may operate.

FIG. 8 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method of simulating defects in an analog circuit design, the method comprising:
    defining a plurality of defect models, wherein the defect models comprise one or more of (a) a defect model comprising at least one resistor and at least one capacitor associated with a terminal of a first transistor disposed in a subcircuit of the analog circuit design, wherein a first terminal of the at least one resistor is connected to a first terminal of the at least one capacitor, and a second terminal of the at least one resistor is connected to a second terminal of the at least one capacitor, and (b) a defect model comprising at least first, second and third resistors, wherein (i) a first terminal of the first resistor is connected to a first terminal of a second transistor disposed in the subcircuit of the analog circuit design, (ii) a first terminal of the second resistor is connected to a second terminal of the second transistor, and a second terminal of the second resistor is connected to a second terminal of the first resistor, (iii) a first terminal of the third resistor is connected to a third terminal of the second transistor, and a second terminal of the third resistor is connected to the second terminal of the second resistor;
    defining a defect scope associated with the plurality of defect models;
    scanning a netlist associated with the analog circuit design to identify a plurality of nodes to which a plurality of defects defined by the plurality of defect models and the defect scope are to be applied;
    injecting the plurality of defects at the plurality of identified nodes; and
    simulating the analog circuit design using the plurality of injected defects.

2. The method of claim 1 wherein at least a first subset of the plurality of nodes represents terminals of a subcircuit of the analog circuit design, the subcircuit being represented at a lower level of hierarchy than a hierarchy of the analog circuit design.

3. The method of claim 1 wherein at least a first subset of the plurality of nodes represents nets of the analog circuit design.

4. The method of claim 1 wherein the defect scope defines at least a portion of the analog circuit design that is to be excluded from receiving the plurality of defects.

5. The method of claim 1 further comprising:
    supplying a default value for the at least one resistor if a defect model associated with the at least one resistor does not specify a resistance value for the at least one resistor.

6. The method of claim 1 wherein the first transistor and the second transistor are not connected to an input port of the subcircuit or an output port of the subcircuit.

7. A non-transitory computer readable medium comprising stored instructions, which when executed by a processor, cause the processor to:

receive a plurality of defect models associated with an analog circuit design, wherein the defect models comprise one or more of (a) a defect model comprising at least one resistor and at least one capacitor associated with a terminal of a first transistor disposed in a subcircuit of the analog circuit design, wherein a first terminal of the at least one resistor is connected to a first terminal of the at least one capacitor, and a second terminal of the at least one resistor is connected to a second terminal of the at least one capacitor, and (b) a defect model comprising at least first, second and third resistors, wherein (i) a first terminal of the first resistor is connected to a first terminal of a second transistor disposed in the subcircuit of the analog circuit design, (ii) a first terminal of the second resistor is connected to a second terminal of the second transistor, and a second terminal of the second resistor is connected to a second terminal of the first resistor, (iii) a first terminal of the third resistor is connected to a third terminal of the second transistor, and a second terminal of the third resistor is connected to the second terminal of the second resistor;

receive a defect scope associated with the plurality of defect models;

scan a netlist associated with the analog circuit design to identify a plurality of nodes to which a plurality of defects defined by the plurality of defect models and the defect scope are to be applied;

inject the plurality of defects at the plurality of identified nodes; and simulate the analog circuit design using the plurality of injected defects.

8. The non-transitory computer readable medium of claim 7 wherein at least a first subset of the plurality of nodes represents terminals of a subcircuit of the analog circuit design, the subcircuit being represented at a lower level of hierarchy than a hierarchy of the analog circuit design.

9. The non-transitory computer readable medium of claim 7 wherein at least a first subset of the plurality of nodes represents nets of the analog circuit design.

10. The non-transitory computer readable medium of claim 7 wherein the defect scope defines a portion of the analog circuit design that is excluded from receiving the plurality of defects.

11. The non-transitory computer readable medium of claim 7 further comprising:

supplying a default value for the at least one resistor if a defect model associated with the at least one resistor does not specify a value of a resistance of the at least one resistor.

12. The non-transitory computer readable medium claim 7 wherein the first transistor and the second transistor are not connected to an input port of the subcircuit or an output port of the subcircuit.

13. A system comprising:

a memory storing instructions; and a processor, coupled with the memory and to execute the instructions, the instructions when executed cause the processor to:

receive a plurality of defect models associated with an analog circuit design, wherein the defect models comprise one or more of (a) a defect model comprising at least one resistor and at least one capacitor associated with a terminal of a first transistor disposed in a subcircuit of the analog circuit design, wherein a first terminal of the at least one resistor is connected to a first terminal of the at least one capacitor, and a second terminal of the at least one resistor is connected to a second terminal of the at least one capacitor, and (b) a defect model comprising at least first, second and third resistors, wherein (i) a first terminal of the first resistor is connected to a first terminal of a second transistor disposed in the subcircuit of the analog circuit design, (ii) a first terminal of the second resistor is connected to a second terminal of the second transistor, and a second terminal of the second resistor is connected to a second terminal of the first resistor, (iii) a first terminal of the third resistor is connected to a third terminal of the second transistor, and a second terminal of the third resistor is connected to the second terminal of the second resistor;

receive a defect scope associated with the plurality of defect models;

scan a netlist associated with the analog circuit design to identify a plurality of nodes to which a plurality of defects defined by the plurality of defect models and the defect scope are to be applied;

inject the plurality of defects at the plurality of identified nodes; and simulate the analog circuit design using the plurality of injected defects.

* * * * *